April 14, 1936.  J. B. MIDDAUGH  2,037,253
CASING CLEANING MACHINE
Filed July 14, 1934   6 Sheets-Sheet 1
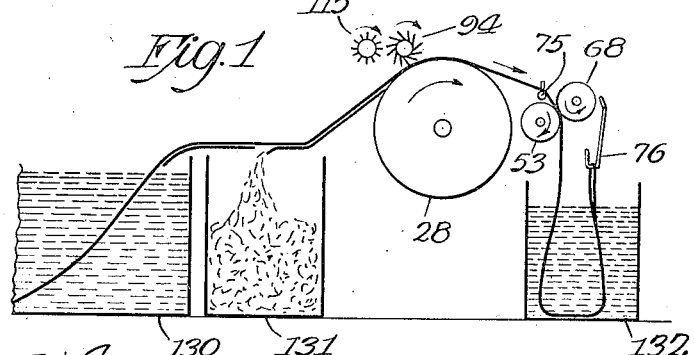
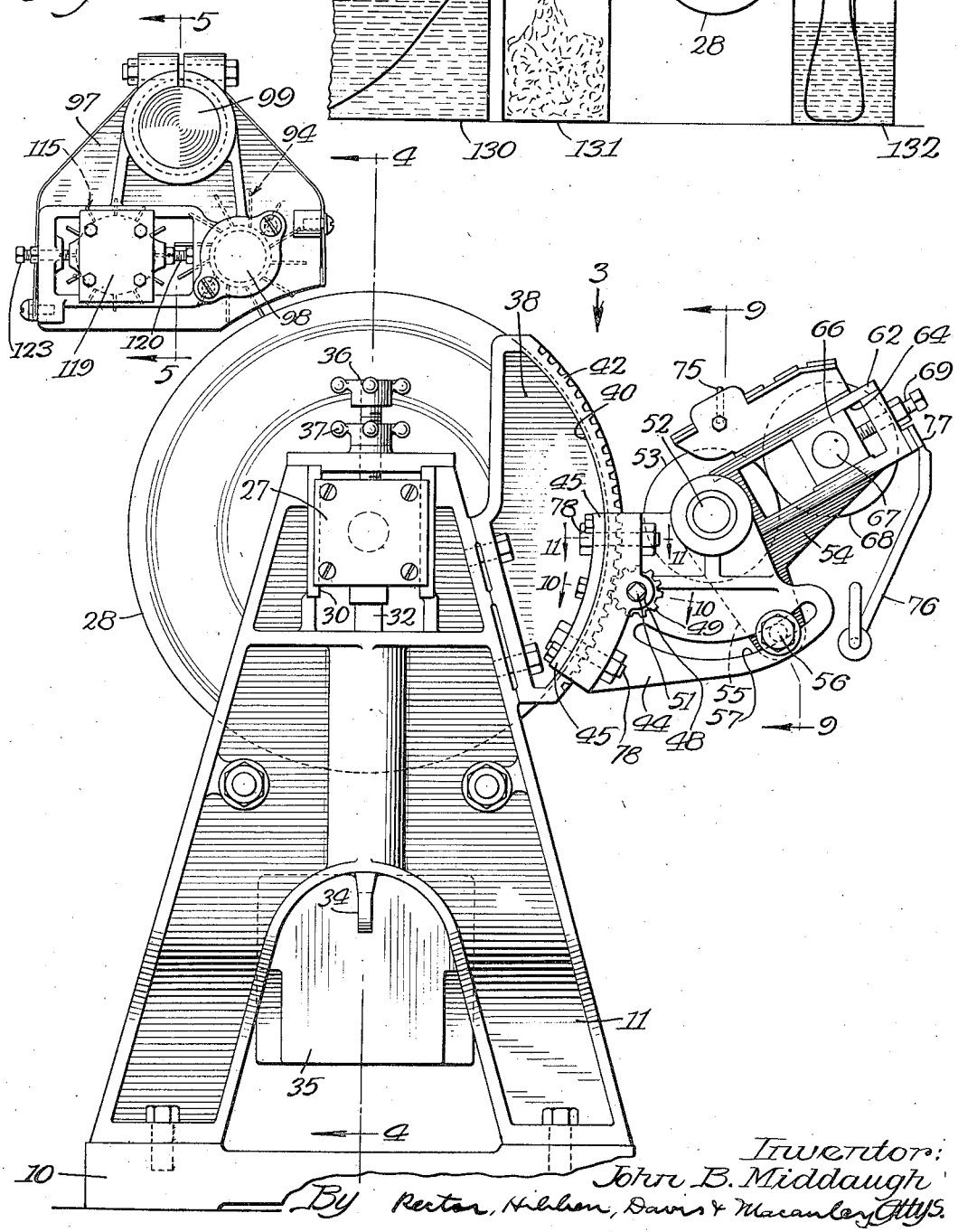
Inventor:
John B. Middaugh
By Rector, Hibben, Davis & Macauley Attys.

April 14, 1936.  J. B. MIDDAUGH  2,037,253

CASING CLEANING MACHINE

Filed July 14, 1934  6 Sheets-Sheet 2

Inventor
John B. Middaugh
By Rector, Hibben, Davis & Macauley Attys

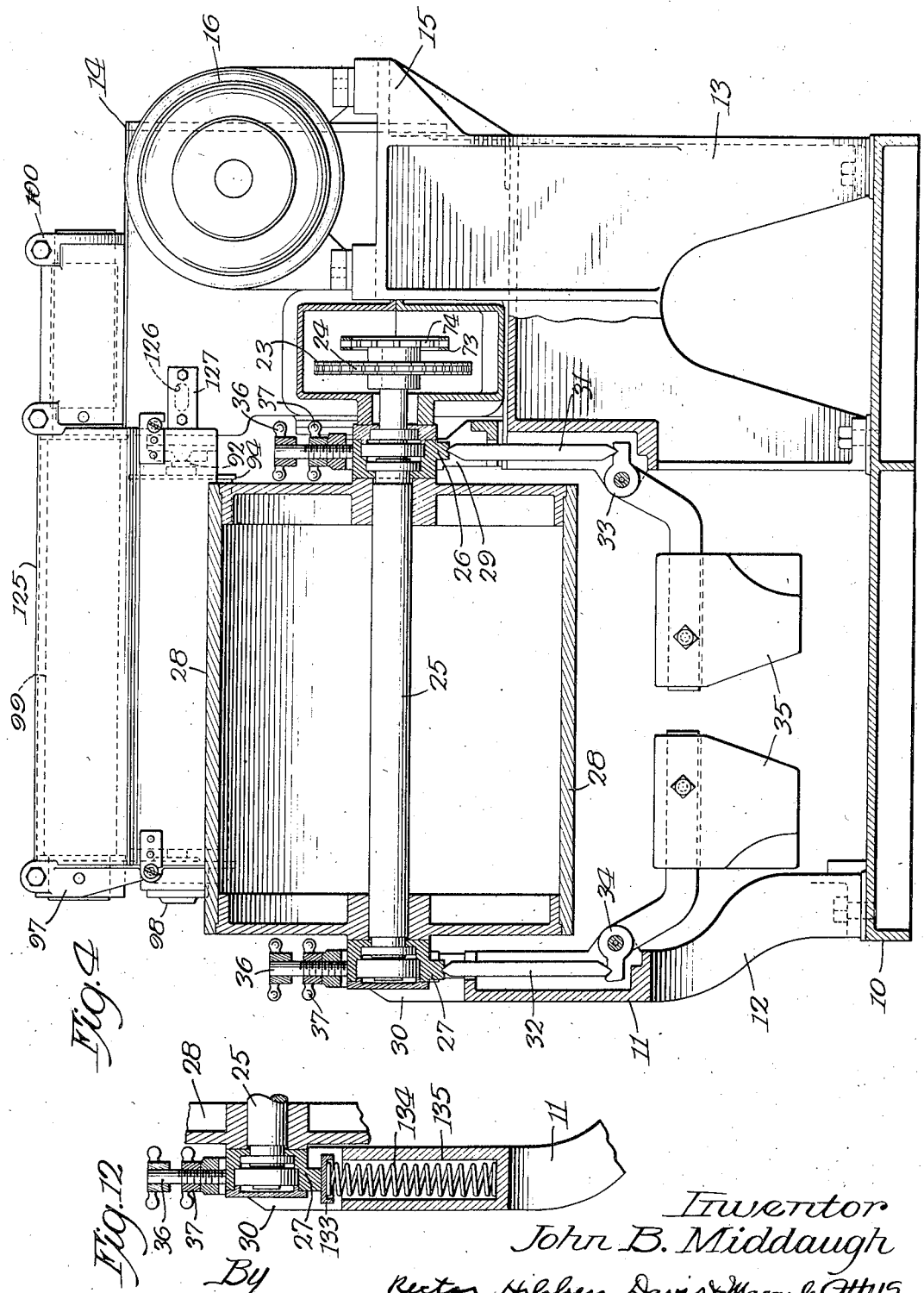

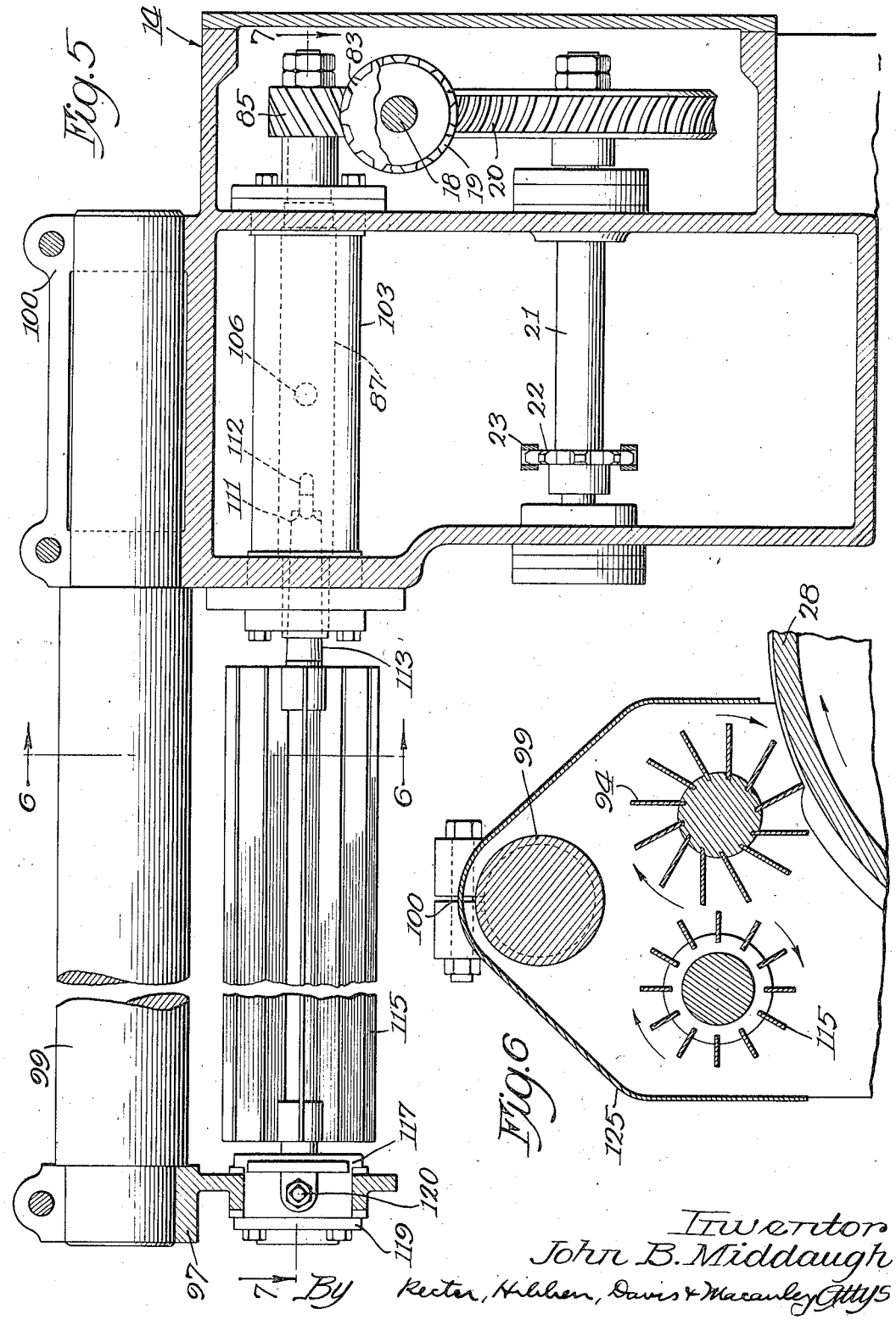

April 14, 1936.  J. B. MIDDAUGH  2,037,253

CASING CLEANING MACHINE

Filed July 14, 1934  6 Sheets—Sheet 6

Inventor
John B. Middaugh
By Rector, Hibben, Davis & Macauley Attys.

Patented Apr. 14, 1936

2,037,253

UNITED STATES PATENT OFFICE 2,037,253

CASING CLEANING MACHINE

John B. Middaugh, Chicago, Ill., assignor, by mesne assignments, to Packers Equipment Development Company, Chicago, Ill., a corporation of Illinois Application July 14, 1934, Serial No. 735,220

27 Claims. (Cl. 17—43)

My invention relates to casing cleaning machines which are generally employed to remove the outer skin, or slice, and the slime from animal intenstines, preliminary to their final conditioning for use as casings for sausages, bolognas and the like, and is more particularly concerned with providing a machine that is characterized by numerous operating advantages over existing types.

One object of my invention is to devise a casing cleaning machine in which the spacing of the feed rolls from the scraper and the angularity of the plane which includes the diameters of the feed rolls may be adjusted to achieve the most efficient operative speeds and the most effective pull relative to the fragility of the casings being handled.

A further object is to provide in a machine of the character indicated, means adapted to permit ready access to one end each of the scraper and fan shafts in order to facilitate the untangling of any casings that might inadvertently wind around the shafts.

A further object is to provide a machine in which the fan and scraper shafts are adapted for quick removal from the machine, without disturbing the balance or any part of the driving assembly of the machine, to permit the replacement of worn shafts and blades.

A further object is to provide means for adjusting the position of the fan shaft relative to the scraper shaft, without affecting the capacity of either shaft for easy and quick removal.

A further object is to provide means for maintaining a substantially constant pressure of the main drum against the casings while being drawn between the drum and the blades of the scraper, the arrangement being such that a very slight excess pressure by the casings causes a further separation of the drum from the scraper, thereby insuring that an enlarged section of casing will not be subjected to a strain sufficient to sever the same.

A further object is to provide a casing cleaning machine in which the several parts are so arranged that a considerable saving in floor space is effected, relative to machines now in use, and in which the substructure of the machine is so shaped as to permit the operator to work rather close to the machine and hence to assume a more comfortable working position.

These and further objects of my invention will be set forth in the following specification, reference being had to the accompanying drawings, and the novel means by which said objects are effectuated will be definitely pointed out in the claims.

In the drawings:

Figure 1 is a diagrammatic, side elevation of my improved machine showing the relation of the essential elements thereof, including the main drum, feeding rolls, scraper and fan, to a casing being drawn through the machine and the several tanks employed to soak the casings and to receive the refuse.

Fig. 2 is an end elevation of the machine, as viewed generally in the direction of the arrow 2 in Fig. 3, the connection between the arm 99 and the frame of the machine being omitted for the sake of clearness.

Fig. 4 is a sectional elevation taken along the line 4—4 in Fig. 2, looking in the direction of the arrows, and showing the mounting of the main drum and the manner of applying a substantially constant pressure thereto.

Fig. 5 is an enlarged section taken along the line 5—5 in Fig. 2, looking in the direction of the arrows, and showing the support for the fan shaft and the driving mechanism therefor.

Fig. 6 is a section along the line 6—6 in Fig. 5, looking in the direction of the arrows, showing the relation of the fan and scraper, and the latter acting on a casing which is being drawn therebetween and the main drum.

Figures 10, 11:
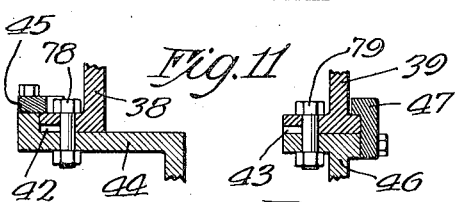

Figs. 10 and 11 are sections along the lines 10—10 and 11—11, respectively, looking in the direction of the arrows, in Fig. 2 and showing certain details of the construction whereby the feeding rolls may be placed at varying distances from the scraper.

Fig. 12 is a sectional elevation, corresponding to that shown in Fig. 4, showing a modified support for the main drum.

Figure 8:
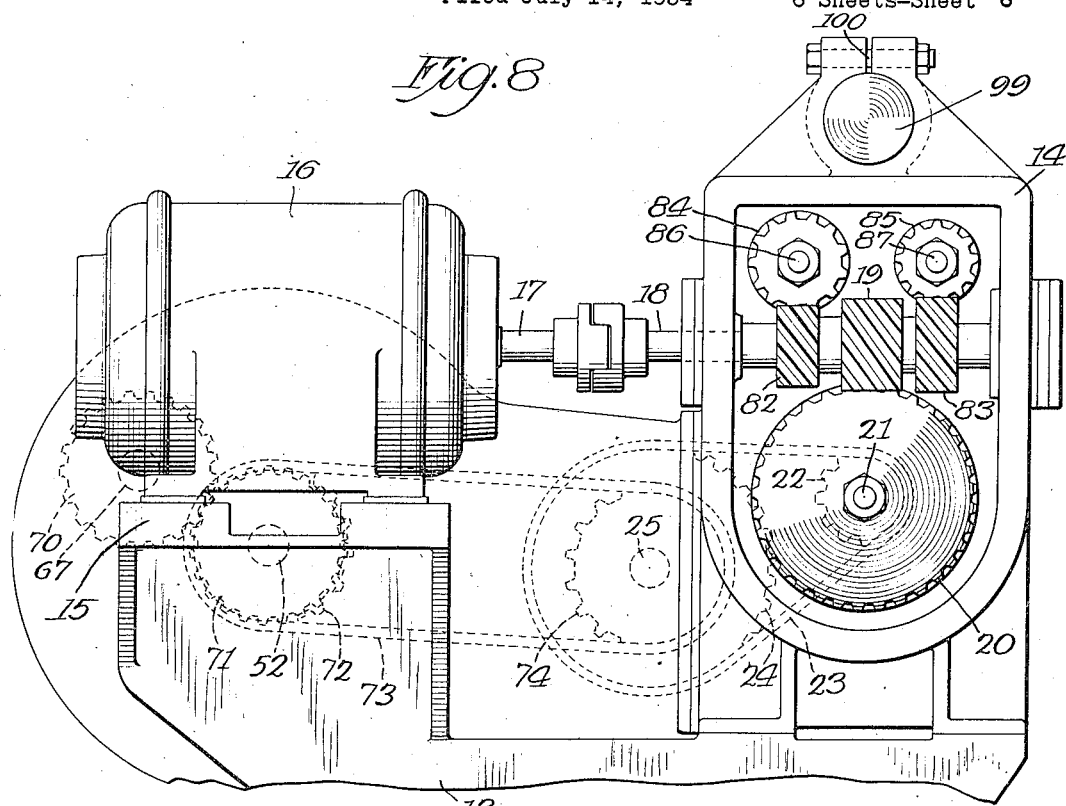
Fig. 8 is a part elevation of one end of the machine, as viewed in the direction of the arrow 8 in Fig. 3, showing the driving connection between the motor and the principal units of the machine, the cover of the main gear box being removed.
Figure 9:
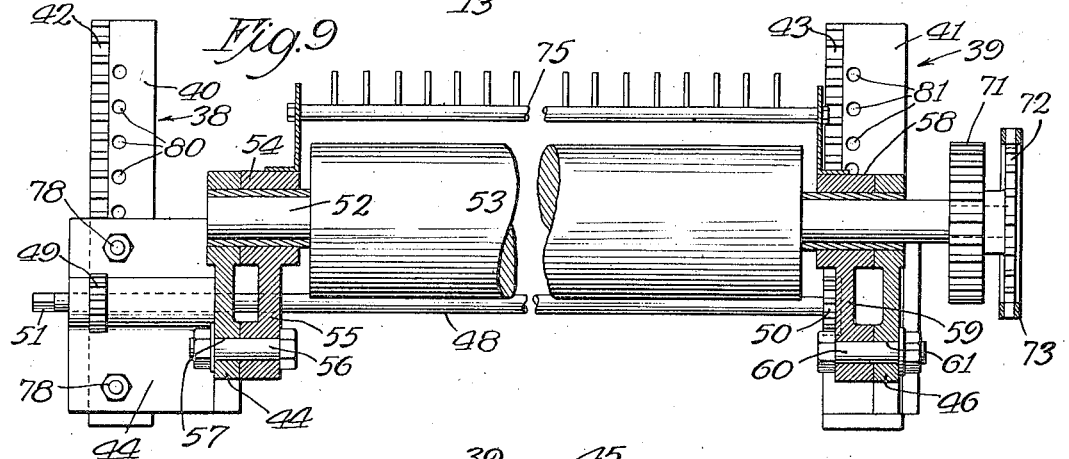
Fig. 9 is a section along the line 9—9 in Fig. 2, looking in the direction of the arrows and showing the swingable mounting of the feeding rolls.

Referring to Figs. 2, 4 and 8, the numeral 10 designates a base plate, having secured to one end thereof a standard 11 which is offset as at 12 at a convenient distance above the plate 10. The purpose of this offset portion is to shorten the length of the base plate and also to enable the operator to stand somewhat closer to, and also to assume a more comfortable position while working the machine. A table 13 is secured to the opposite end of the plate 10 and a gear case 14 is bolted to the top of this table. Preferably, integrally formed with the table 13 is a motor bracket 15 which supports a motor 16 that furnishes the driving power for the machine.

The motor shaft 17 (see Fig. 8) is drivably connected to an intermediate shaft 18 which extends across and is journaled in the gear case 14. A worm 19 is secured to the shaft 18 within the case 14 and meshes with a worm gear 20 that is fixed to a shaft 21 that is also journaled in the gear case. Also secured on the shaft 21 is a sprocket 22 which, by means of a chain 23, drives a sprocket 24 that is fixed on a shaft 25 (see Figs. 4 and 8).

The shaft 25 is journaled in floating bearing boxes 26 and 27 and between these boxes, a drum 28 having a smooth peripheral surface is secured to the shaft 25. The box 26 is vertically movable in a guideway 29 that is carried by the table 13, while the box 27 is similarly movable in a guideway 30 formed on the standard 11. The weight of the drum 28 and its associated parts is supported on a pair of struts 31 and 32 having knife-edged ends, the upper ends of these struts fitting in appropriately shaped depressions provided on the under sides of the bearing boxes 26 and 27, respectively, while the opposite ends of the same struts rest in similarly shaped depressions provided in the outwardly extending arms of levers 33 and 34, respectively. The lever 33 is pivotally mounted on the table 13, while the lever 34 is pivotally mounted on the standard 11. The other arms of these levers extend toward each other (see Fig. 4) and are each provided with counter-weights 35, which are shiftable along the indicated arms in order to provide any desired upward pressure against the boxes 26 and 27 and, accordingly, against the drum 28 which coacts with a scraper, as hereinafter described. The upper position of the drum 28 is determined by set screws 36 which engage the upper surfaces of the boxes 26 and 27 and the positions of these screws are fixed by lock nuts 37.

Referring to Figs. 2, 9, 10 and 11, a bracket 38 is bolted to the right side of the standard 11, as viewed in Fig. 2, and a similar bracket 39 is secured to the table 13. These brackets are provided with curved webs 40 and 41, respectively, whose outer surfaces are provided with gear teeth forming gear sectors 42 and 43, respectively. The pitch circles of these gear sectors are concentric with the periphery of the drum 28. A bracket 44 is slidably mounted on the web 40 by means of a curved, retaining plate 45 which is bolted to the bracket 44 and which engages the inner surface of the web 40. A similar bracket 46 is slidably mounted on the web 41 by means of a curved, retaining plate 47 which engages the inner, plain surface of said web. A shaft 48 extends between and is journaled in the brackets 44 and 46 and has affixed thereto a pair of pinions 49 and 50 which mesh with the gear sectors 42 and 43, respectively. The end of the shaft 48 extends beyond the bracket 44 and may be squared as at 51 to receive a suitable crank handle, whereby the brackets 44 and 46 may be simultaneously moved along the gear sectors for a purpose hereinafter explained.

A shaft 52 is journaled in and extends between the brackets 44 and 46 and is provided with a feed roll 53 of appropriate construction.

A bell crank lever 54 is freely journaled on the shaft 52 between the bracket 44 and the adjacent end of the feed roll 53 and one arm 55 extends downwardly and is provided at its lower end with a bolt 56 which is operable in an arcuate slot 57 provided in the bracket 44. Similarly, a bell crank lever 58 is journaled on the shaft 52 between the bracket 46 and the adjacent end of the roll 53 and its lower arm 59 is provided with a bolt 60 which operates within an arcuate slot 61 provided in the bracket 46.

The other arms 62 and 63 of the levers 54 and 58, respectively, are provided with guideways 64 and 65, respectively, within which operate bearing blocks 66 that rotatably support a shaft 67 carrying a feeding roll 68. The relation of the contacting surfaces of the feed rolls 53 and 68 can be adjusted in the usual manner by means of an adjusting screw 69 which engages with the bearing blocks that carry the shaft of the feeding roll 68.

Figure 3:
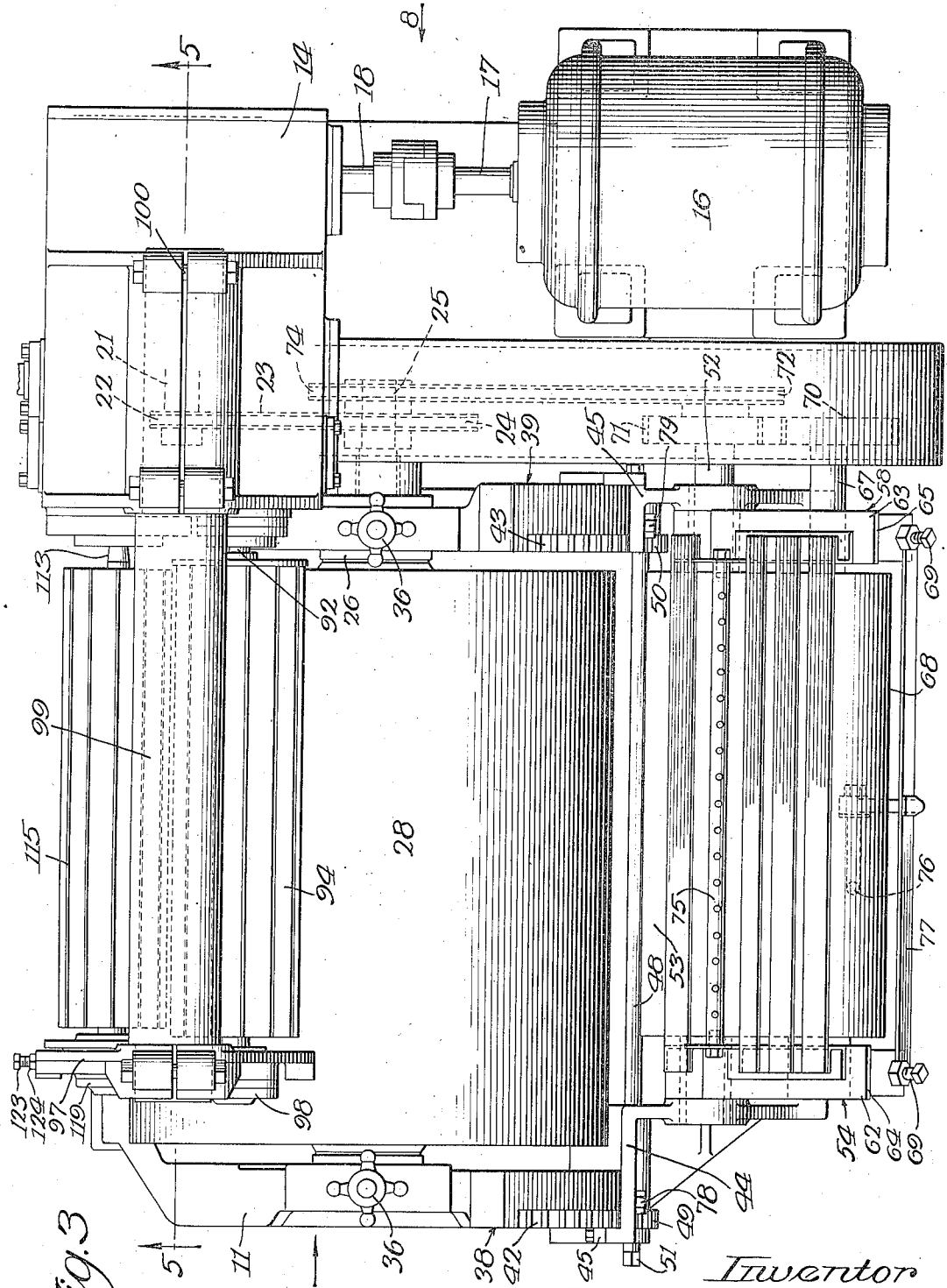
Fig. 3 is a plan view of the machine, as viewed in the direction of the arrow 3 in Fig. 2.

The shaft 67 is extended to receive a spur gear 70 (see Figs. 3 and 8) which meshes with a gear 71 mounted on the shaft 52. The latter shaft has also affixed thereto a sprocket 72 which is driven by a sprocket 74 through a chain 73, the latter sprocket being in turn affixed to the shaft 25 and hence is drivably connected to the motor 16.

The usual comb 75 is bridged between the lever arms 62 and 63 on the entrance side of the feeding rolls 53 and 68, this comb furnishing the customary means for insuring a separation between the casing strands as they are being drawn between the feeding rolls. Likewise, the usual collecting hook 76 depends from a bar 77 which is bridged between the lever arms 62 and 63 and it is over this hook that the operator hangs the loop ends of the casings in order to maintain this important portion of the several casings.

From the foregoing, it will be understood that, not only may the entire feeding roll mechanism be shifted around the drum 28, within the limits of the gear sector lengths, but also that the angularity of the plane which includes the shafts of the feeding rolls may be likewise shifted as desired. The purpose of these two adjustments will be subsequently explained. The shifted position of the brackets 44 and 46 is maintained by appropriate bolts 78 and 79 which may be inserted through holes 80 and 81 in the webs 40 and 41, all respectively.

Figure 7:
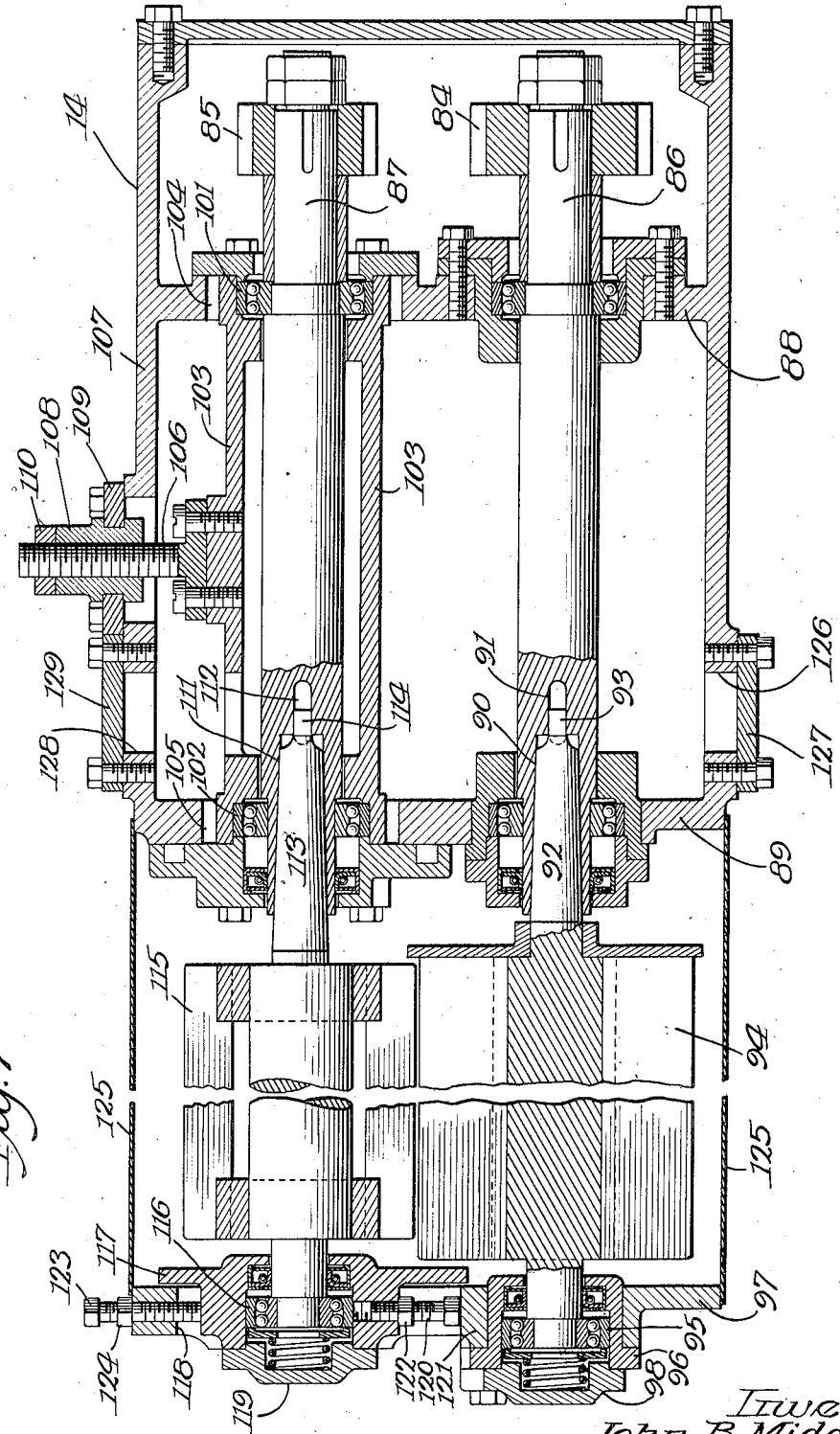
Fig. 7 is a section along the line 7—7 in Fig. 5, looking in the direction of the arrows, showing the manner of driving the fan and scraper and the detachable mounting of these units.

Referring to Figs. 5, 7 and 8, worms 82 and 83 are secured to the shaft 18 on opposite sides of the worm 19 within the gear case 14 and these worms mesh, respectively, with worm gears 84 and 85 which are respectively secured to the ends of scraper and fan driving shafts 86 and 87, respectively.

Referring more particularly to Fig. 7, one end of the shaft 86 is journaled in a web 88 which extends across the interior of the gear case 14, while the opposite end is journaled in an end wall 89 of the same case. The last named end of the shaft 86 is provided with a tapered socket 90 which terminates in a slot 91 that extends completely through the shaft and fitting within the socket and slot is the tapered portion of a spindle 92 whose flat end 93 fits within the slot 91. The spindle has affixed thereto the usual blades forming a scraper 94 and the opposite end of the spindle 92 is journaled in a bearing 95 that is supported in a case 96 carried by the lower end of a hanger 97. Outward, endwise movement of the bearing 95 is prevented by a cover plate 98 which is secured to the hanger. The upper end of the hanger is clamped to the end of an arm 99 which overhangs the drum 28 and which is clamped, as at 100, to the gear case 14.

The fan driving shaft 87 is journaled at its opposite ends in ball bearings 101 and 102 which are carried in the ends, respectively, of a sleeve 103 which is slidably supported in elongated slots 104 and 105 formed in the web 88 and end wall 89, respectively, whereby the shaft 87 may be adjusted, as hereinafter described, toward and away from the driving shaft 86. Fixed to an intermediate portion of the sleeve 103 is an adjusting screw 106 which extends outwardly through a hole provided in a side wall 107 of the gear case 14 and is threaded through a nut 108 which is held against endwise movement by engaging with a cover plate 109. By rotating the fixed nut 108, the screw 106 is moved inwardly or outwardly, as the case may be, and the adjustment so effected may be locked by the usual lock nut 110.

The end of the shaft 87 which passes through the end wall 89 is provided with a tapered socket 111 which terminates in a slot 112, comparable to the slot 91 and the tapered portion of a spindle 113 fits within the socket 111, with its flat end fitting into the slot 112, and thereby establishing a driving engagement with the shaft 87. The spindle 113 is provided with the usual blades constituting a fan 115 whose opposite end is journaled in a ball bearing 116 that is carried in a case 117. The latter case is shiftably mounted in an elongated slot 118 provided in the hanger 97, and the bearing 116 is retained in position by a cover plate 119 which is bolted to the case 117.

Whenever the sleeve 103 is adjusted by rotating the screw 106, a corresponding adjustment of the opposite end of the fan spindle 113 is effected by suitably rotating an adjusting screw 120 whose head normally contacts with a shoulder 121 provided on the hanger 97 and whose adjustment may be locked by a nut 122, it being understood that the screw 120 is threaded in a hole provided in the case 117. On the opposite side of the case and in line with the screw 120 is an adjusting screw 123 which is threaded through the hanger 97 and abuts against the adjacent face of the case 117. Adjustment of this screw may be locked by a nut 124.

From the foregoing, it is apparent that the bearings 95 and 116 may be simply and easily removed for purpose of replacement or repair by unbolting the cover plates 98 and 119, respectively, and that either the fan or the scraper may be removed by simply unclamping the hanger 97 from the arm 99, or the latter hanger may be removed for the purpose of untangling any casings that might inadvertently wind around the scraper 94. As a safety provision, the fan and scraper are preferably encased by a cover plate 125.

The removal of the bearings 95 and 116, or the fan and the scraper is effected without requiring any dismantling of the principal driving assembly of the machine, since the fan and scraper are provided with driving connections comparable to the ordinary shank of a taper shank drill. In order to expedite removal of the tapered portions of the fan and scraper spindles from their driving shafts, it is contemplated that a hand hole opening 126 may be provided in the associated side wall of the gear case 14, which hole is ordinarily closed by a cover plate 127, it being understood that this hand hole is in substantial registration with the slot 91. Similarly, on the opposite side of the gear case, a hand hole opening 128 is provided in substantial alignment with the slot 112 and this opening is ordinarily closed by a cover plate 129. When it is required to remove either of the indicated spindles, it is simply necessary to remove the adjacent cover plate and insert a taper drift through the hand hole opening for insertion in either the slot 91 or 112.

The operation of cleaning animal casings by my improved machine is diagrammatically illustrated in Fig. 1, wherein the numeral 130 designates a tank of water in which the casings are soaked and from which they are initially drawn over a refuse tank 131 on their way to the scraper 94. At this time, the casings have been centered and so provide a loop at one end thereof.

The direction of rotation of the main drum 28, scraper 94 and fan 115 are as generally indicated by the arrows in Fig. 1 and the workman commences the operation by peeling back the tough, outer skin, or slice of the casing from the center portion thereof and then inserts each strand of the casing between the scraper 94 and the drum and, by working the casing back and forth between these parts, he is enabled to extract the slime from the interior of the casing at the centered end thereof. Thereupon, he connects his string to the centered end of the casing and drops the string between the feeding rolls 53 and 68 which thereupon draw the casing therebetween and permits the centered end thereof to be hung on the hook 76 for ultimate collection in the tank 132.

The operator is then free to pick another casing out of the tank 130, since the subsequent operation on the casing first handled will be automatically completed by the feeding rolls drawing the casing between the scraper and the drum. The coaction of the scraper and the drum not only squeezes the slime from the interior of the casing into the refuse tank 131, but also strips the slice from the exterior of the casing. After any one casing has been started between the feeding rolls, the strands thereof are dropped between available teeth of the comb 75, in order that these strands will not become tangled with succeeding strands of following casings.

The purpose of providing the two adjustments on the feeding mechanism will now be described. Generally speaking, the largest casings are characterized by a higher degree of toughness, so that it is possible to apply a direct pull thereto by the feeding rolls in drawing the casings between the scraper and the main drum, with a consequent speeding up of the machine operation. Accordingly, the brackets 44 and 46 may be moved upwardly along the gear sectors 42 and 43 to a position where such direct pull may be obtained. Sheep casings, however, are considerably more fragile, and it is necessary to permit these casings to wrap themselves around a certain portion of the peripheral surface of the main drum in order to secure some degree of frictional contact between this surface and the casings and thereby neutralize a portion of the pull of the feeding mechanism. Under these conditions, the feeding mechanism might occupy the position generally shown in Fig. 2.

In whatever position the brackets 44 and 46 may be located, the cooperating portions of the feeding rolls may be further adjusted by rocking the bell crank levers 54 and 58 in order to provide the most convenient angle for receiving the ends of the casings, all with the purpose of speeding the operation.

With respect to the relation of the drum 28 to the scraper 94, it will be understood that the counter-weights 35 will be so adjusted that only a very slight excess, downwardly acting pressure will be necessary to move the drum away from the scraper. This action is necessary because, otherwise, a slightly enlarged portion of a casing might not pass easily between the scraper and the drum and might, therefore, be subject to a rupturing strain. With my improved construction, however, such enlarged portions may pass easily beneath the scraper, because the delicate adjustment provided by the counter-weight and the struts 31 and 32 having the knife-edged ends insures a dipping of the drum 28 to permit the passage of such enlarged portions, while at the same time subjecting this portion to substantially the same pressure as the remainder of the casing.

In Fig. 12 is shown a different type of yieldable support for the main drum 28, the modification being shown only with respect to that end of the drum which is carried by the standard 11 and it being understood that a similar provision is made for the table 13.

The underside of the box 27 rests on an inverted cup 133 which receives the upper end of a spring 134 that is supported in and guided by a pocket 135 formed on the standard 11. The spring 134 and its companion spring (not shown) on the table 13 normally act to maintain the surface of the drum 28 in operative relation to the scraper 94 and yield to excess pressures that might be caused by the passage of certain casing portions between the scraper and drum.

I claim:

1. In a casing cleaning machine, the combination of a main drum, a scraper coacting therewith, feeding mechanism for drawing casings between the scraper and drum, and means for varying the distance between the scraper and mechanism while maintaining the relation of the scraper and drum.

2. In a casing cleaning machine, the combination of a frame, a main drum rotatable in the frame, a scraper coacting with the drum, feeding mechanism for drawing casings between the scraper and drum, and means for shifting the mechanism relative to the surface of the drum to vary the distance between the scraper and mechanism.

3. In a casing cleaning machine, the combination of a frame, a main drum rotatable in the frame, a scraper coacting with the drum, feeding mechanism mounted on the frame for drawing casings between the scraper and drum, means for shifting the mechanism around the surface of the drum, and means for holding the mechanism in a predetermined shifted position.

4. In a casing cleaning machine, the combination of a frame having gear sectors, a main drum rotatable in the frame between the sectors, a scraper coacting with the drum, a pair of shiftable brackets on the frame adjacent the ends of the drum, respectively, a pair of feeding rolls rotatably mounted in the brackets, a pinion in mesh with each gear sector, respectively, a shaft common to the pinions carried by the brackets and operable to change the distance between the scraper and rolls, and means for holding the brackets in a predetermined shifted position.

5. In a casing cleaning machine, the combination of a frame having arcuate gear sectors, a main drum rotatable in the frame between the sectors, the pitch circles of the sectors being concentric with the periphery of the drum, a scraper coacting with the drum, a pair of shiftable brackets on the frame adjacent the ends of the drum, respectively, a pair of feeding rolls rotatably mounted in the brackets, a pinion in mesh with each gear, respectively, a shaft common to the pinions carried by the brackets and operable to change the distance between the scraper and rolls, and means for holding the brackets in a predetermined shifted position.

6. In a casing cleaning machine, the combination of a main drum, a scraper coacting therewith, feeding mechanism for drawing casings between the scraper and drum comprising a pair of rolls, and means for simultaneously adjusting both rolls to vary the position of their cooperative portions relative to the scraper.

7. In a casing cleaning machine, the combination of a frame, a main drum rotatable on the frame, a scraper coacting therewith, an arm pivoted on the frame, a pair of feeding rolls mounted on the arm whereby both rolls may be simultaneously adjusted to vary the position of their cooperative portions relative to the scraper, and means for holding the arms in any adjusted position.

8. In a casing cleaning machine, the combination of a frame, a drum rotatable on the frame, a scraper coacting therewith, levers pivoted on the frame adjacent the ends of the drum, respectively, a pair of feeding rolls rotatably mounted in one arm of each lever, a pin mounted in the other arm of each lever and operable in an arcuate slot provided in the frame whereby both rolls may be simultaneously adjusted to vary the position of their cooperating portions relative to the scraper, and means for holding the pins in any adjusted position.

9. In a casing cleaning machine, the combination of a main drum, a scraper coacting therewith, feeding mechanism comprising a pair of rolls for drawing casings between the scraper and drum, means for varying the distance between the scraper and mechanism, and independent means for simultaneously adjusting both rolls to vary the position of their cooperating portions relative to the scraper.

10. In a casing cleaning machine, the combination of a frame, a main drum rotatable in the frame, a scraper coacting with the drum, feeding mechanism comprising a pair of rolls for drawing casings between the scraper and drum shiftable on the frame around the surface of the drum, means for holding the mechanism in any one of a number of predetermined positions, and independent means for simultaneously adjusting both rolls to vary the position of their cooperating portions relative to the scraper.

11. In a casing cleaning machine, the combination of a frame, a main drum rotatable in the frame, a scraper coacting with the drum, feeding mechanism mounted on the frame comprising a pair of rolls for drawing casings between the scraper and drum, means for shifting the mechanism around the surface of the drum, means for holding the mechanism in a predetermined shifted position, and independent means for simultaneously adjusting both rolls to vary the position of their cooperating portions relative to the scraper.

12. In a casing cleaning machine, the combination of a frame having gear sectors, a main drum rotatable in the frame, a scraper coacting with the drum, shiftable brackets on the frame adjacent the ends of the drum, respectively, an arm pivoted on each bracket, a pair of feeding rolls rotatably supported by the arms whereby both rolls may be simultaneously adjusted to vary the position of their cooperating portions relative to the scraper, means for holding the arms in any adjusted position, a pinion in mesh with each gear sector, a shaft common to the pinions carried by the brackets and operable to move the brackets to thereby change the distance between the scraper and rolls, and means for holding the brackets in a predetermined shifted position.

13. In a casing cleaning machine, the combination of a frame having gear sectors, a main drum rotatable in the frame, a scraper coacting with the drum, shiftable brackets on the frame adjacent the ends of the drum, respectively, a lever pivoted on each bracket, feed rolls rotatably mounted in one arm of each lever, a pin mounted in the other arm of each lever and operable in an arcuate slot provided in the brackets whereby both rolls may be simultaneously adjusted to vary the position of their cooperating portions relative to the scraper, means for holding the pins in a predetermined adjusted position, a pinion in mesh with each gear sector, a shaft common to the pinions carried by the brackets and operable to shift the brackets to thereby change the distance between the scraper and rolls, and means for holding the brackets in their shifted positions.

14. In a casing cleaning machine, the combination of a frame, a main drum rotatable in the frame, a scraper coacting with the drum and a fan coacting with the scraper, each comprising a shaft and blades mounted thereon, one end of each shaft being extended to fit within a socket provided in the frame, and removable bearings carried by the frame supporting the opposite ends of the shafts.

15. In a casing cleaning machine, the combination of a frame, a main drum rotatable in the frame, an arm on the frame overhanging the drum, a scraper beneath the arm coacting with the drum and a fan coacting with the scraper, each comprising a shaft and blades mounted thereon, one end of each shaft being extended and tapered to fit within a socket provided in the frame, and removable bearings carried by the arm supporting the opposite ends of the shafts.

16. In a casing cleaning machine, the combination of a frame, a scraper, a fan coacting with the scraper, the scraper and fan each comprising a shaft and blades mounted thereon, means for adjusting the fan shaft relative to the scraper shaft comprising a driving shaft supporting the fan shaft, a sleeve carried by the frame and supporting the driving shaft, and an adjusting screw mounted in the frame and connected to the sleeve.

17. In a casing cleaning machine, the combination of a frame having a guide portion, a main drum rotatable in the frame, a scraper coacting with the drum, a bracket shiftable on the guide portion, a pair of feeding rolls rotatably mounted in the bracket and extending across the face of the drum, the shifting of the bracket varying the distance between the scraper and rolls and the relation of the latter to the drum surface, and means for holding the bracket in any shifted position.

18. In a casing cleaning machine, the combination of a frame having an arcuate guide portion, a main drum rotatable in the frame, the arc of the portion being concentric with the periphery of the drum, a scraper coacting with the drum, a bracket shiftable on the guide portion, a pair of feeding rolls rotatably mounted in the bracket and extending across the face of the drum, the shifting of the bracket varying the distance between the scraper and rolls around the surface of the drum and the relation of the rolls to the drum surface, and means for holding the bracket in any shifted position.

19. In a casing cleaning machine, the combination of a main drum, a scraper coacting therewith, feeding mechanism comprising a pair of rolls for drawing casings between the scraper and drum, means for varying the distance between the scraper and mechanism, and means for varying the position of the cooperating portions of the rolls relative to the scraper.

20. In a casing cleaning machine, the combination of a frame, a main drum rotatable in the frame, a scraper coacting with the drum, feeding mechanism comprising a pair of rolls for drawing casings between the scraper and drum shiftable on the frame around the surface of the drum, means for holding the mechanism in any shifted position, and means for varying the position of the cooperating portions of the rolls relative to the scraper.

21. In a casing cleaning machine, the combination of a main drum, a scraper coacting with the drum, feeding mechanism for drawing casings between the scraper and drum, the scraper and mechanism being located at different elevations relative to the axis of the drum, and means for varying the vertical distance between the scraper and mechanism while maintaining the relation of the scraper and drum.

22. In a casing cleaning machine, the combination of a main drum, a scraper coacting with the drum, feeding mechanism for drawing casings between the scraper and drum and positioned relative to the scraper and drum to cause the casings to contact with a portion of the drum surface, and means for varying the position of the mechanism to vary the extent of casing contact.

23. In a casing cleaning machine, the combination of a frame, a scraper, a fan coacting with the scraper, the scraper and fan each comprising a shaft and blade mounted thereon, a driving shaft supporting the fan shaft, a sleeve carried by the frame and supporting the driving shaft, and means for adjusting the sleeve to vary the relation of the fan and scraper.

24. In a casing cleaning machine, the combination of a frame, a pair of driving shafts rotatable in the frame, a scraper and a fan coacting with the scraper each comprising a shaft and blade mounted thereon, means for detachably connecting one end of the fan and scraper shafts to the driving shafts, respectively, and removable bearings carried by the frame supporting the opposite ends of the fan and scraper shafts.

25. In a casing cleaning machine, the combination of a frame, a pair of driving shafts rotatable in the frame each including at one end thereof a tapered socket terminating in a slot, a scraper and a fan coacting with the scraper each comprising a shaft and blade mounted thereon, one end of the fan and scraper shafts being tapered to fit within the driving shaft socket and having portions extended to fit within the driving shaft slots, and removable bearings carried by the frame supporting the opposite ends of the fan and scraper shafts.

26. In a casing cleaning machine, the combination of a frame, a main drum rotatable in the frame, an arm on the frame extending across the face of the drum, a scraper coacting with the drum and a fan coacting with the scraper each comprising a shaft and blade mounted thereon, a pair of driving shafts rotatable in the frame, means for detachably connecting one end of the fan and scraper shafts to the driving shafts, respectively, and removable bearings carried by the arm supporting the opposite ends of the fan and scraper shafts.

27. A casing cleaning machine comprising a frame provided with a pair of spaced, spring-receiving pockets, springs located in the pockets, bearing boxes slidable in the frame and resiliently actuated by the springs, a drum rotatable in the boxes, and means for limiting the movement of the drum under the action of the springs, and a scraper coacting with the drum, the springs actuating the drum to exert a predetermined pressure against casings being drawn between the drum and scraper.

JOHN B. MIDDAUGH.